United States Patent [19]

Okazaki et al.

[11] Patent Number: 5,211,452

[45] Date of Patent: May 18, 1993

[54] ANTI-SKID BRAKE SYSTEM WITH RESET OF THRESHOLDS DUE TO CHANGING ROAD SURFACE COFFICIENT

[75] Inventors: Haruki Okazaki; Fumio Kageyama; Kazutoshi Nobumoto; Yoji Kurihara, all of Hiroshima, Japan

[73] Assignee: Mazda Motor Corporation, Hiroshima, Japan

[21] Appl. No.: 794,576

[22] Filed: Nov. 19, 1991

[30] Foreign Application Priority Data

Nov. 27, 1990 [JP] Japan ................... 2-324015

[51] Int. Cl.⁵ .......................... B60T 8/58; B60T 8/60
[52] U.S. Cl. ................................ 303/014; 303/106; 303/100; 364/426.02
[58] Field of Search .......... 303/95, 100, 104, 105–107, 303/108, 110, 102; 180/197; 364/426.02, 426.03

[56] References Cited

U.S. PATENT DOCUMENTS

| | | | |
|---|---|---|---|
| 4,929,035 | 5/1990 | Shimanuki | 303/100 X |
| 5,000,281 | 3/1991 | Nobumoto et al. | 303/100 X |
| 5,058,018 | 10/1991 | Kuwana et al. | 303/102 X |

Primary Examiner—Douglas C. Butler
Assistant Examiner—Josie A. Ballato
Attorney, Agent, or Firm—Fish & Richardson

[57] ABSTRACT

A shift to control for retaining the braking force from the control for elevating the braking force is implemented when deceleration of the wheel exceeds a first predetermined threshold value when the wheels are braked. The first predetermined threshold value is so set as to become smaller as an assumed road surface friction coefficient $\mu$ is smaller. The first threshold value is further altered to a larger value by altering the assumed road surface friction coefficient $\mu$ to a higher one when the period of time required from the start of the control for elevating the braking force to the start of the following control for retaining the braking force is equal to or shorter than a predetermined period of time.

22 Claims, 5 Drawing Sheets

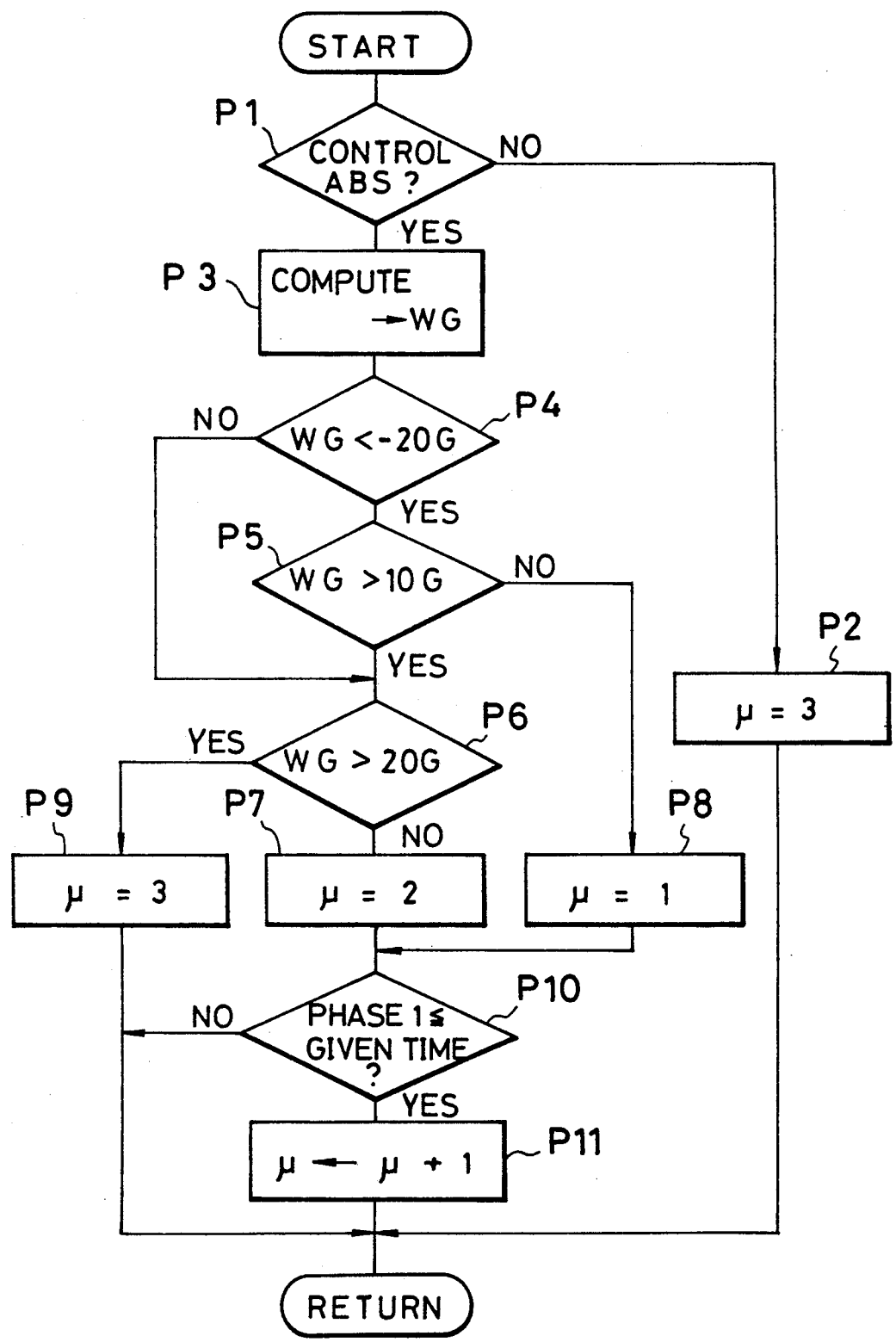

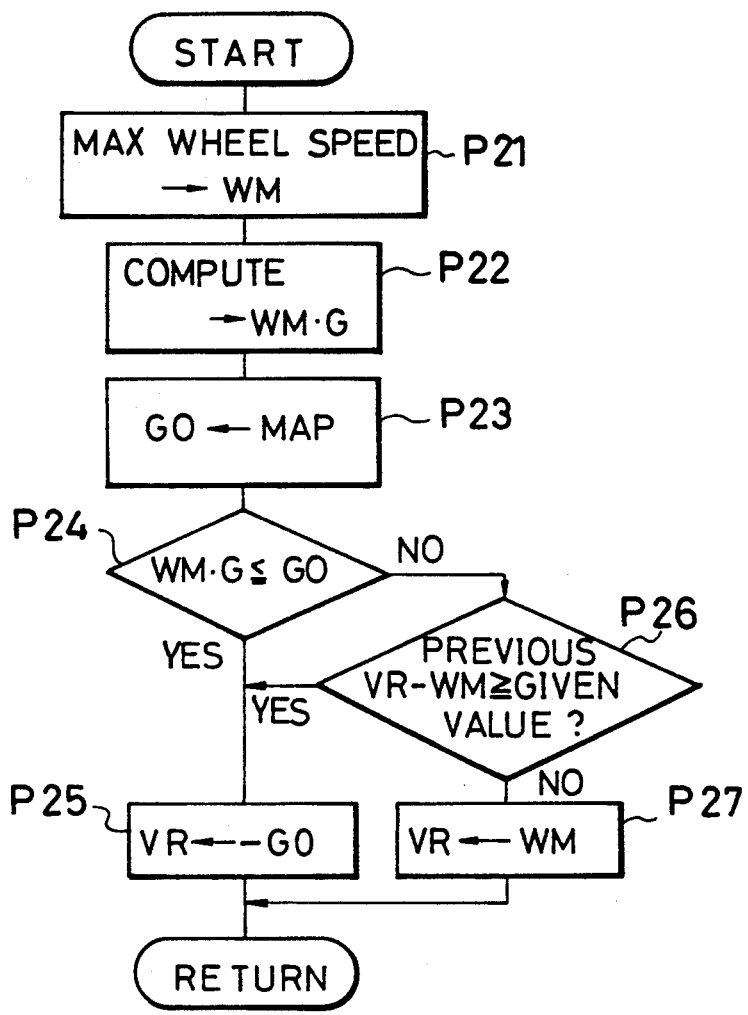
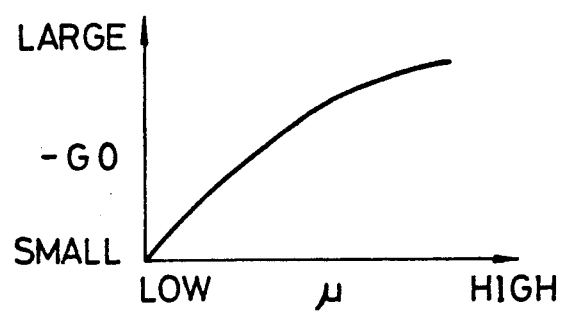

ANTI-SKID BRAKE SYSTEM WITH RESET OF THRESHOLDS DUE TO CHANGING ROAD SURFACE COFFICIENT

BACKGROUND OF THE INVENTION

1. Field of the Invention

The present invention relates to an anti-skid brake system for an automotive vehicle.

2. Description of the Related Art

Recently, an increasing number of automotive vehicles are loaded with an anti-skid brake system (usually called "ABS system") which is arranged to prevent the wheel from locking at the time of braking. In order to operate the anti-skid brake system, basically, it is required to determine a slip value of the wheel that is incipiently locked and the slip value is determined on the basis of a speed of the vehicle body and a speed of the wheel.

Generally speaking, as disclosed in Japanese Patent Laid-Open Publication (kokai) No. 196,853/1986, a vehicle body speed assumed on the basis of each of the wheel speeds is employed as the vehicle body speed for determining the slip value. Further, Japanese Patent Laid-open Publication (kokai) No. 194,647/1983 discloses an assumed vehicle body speed which can change a parameter for determining the assumed vehicle body speed in accordance with the period of time for which a braking force is controlled so as to be decreased.

On the other hand, in order to appropriately implement the control of the ABS, i.e. the anti-skid brake system, a control value for controlling the ABS is changed so as to agree with a road surface friction coefficient $\mu$, for example, a threshold value for performing a shift between the control for reducing, retaining and elevating the braking force.

In order to alter the control value for controlling the anti-skid brake system (ABS), it is of great importance to detect an accurate road surface friction coefficient $\mu$ along the actual road surface on which the automotive vehicle is travelling.

Recently, on the other hand, the control is changed from the control for increasing the braking force to the control for retaining the braking force when the speed of decelerating the wheel reaches a value lower than a predetermined value, and it is proposed that the speed of decelerating the wheel as a threshold value for shifting the braking force is made smaller as the road surface friction coefficient $\mu$ becomes smaller.

In this case, when the ABS control is performed from the state in which the road surface friction coefficient $\mu$ is small to the state in which an actual road surface friction coefficient $\mu$ becomes high, it is of significance to immediately detect the high road surface friction coefficient $\mu$ with high response in order to ensure a sufficient magnitude of the braking force in agreement with the road surface friction coefficient $\mu$ and to shorten the braking distance.

More specifically, in instances where a portion of road is lower in road surface friction coefficient $\mu$, e.g. an ice-covered road surface, than the rest of the road that has a higher road surface friction coefficient $\mu$, the period of time for which the automotive vehicle passes through the portion of the road having such a low road surface friction coefficient $\mu$ is shorter than through the rest of the road. However, once it is determined that the road surface friction coefficient $\mu$ is low, a delay may be caused in a response to determine a shift from the low road surface friction coefficient $\mu$ to the high road surface friction coefficient $\mu$ and the braking distance becomes longer due to the delay.

SUMMARY OF THE INVENTION

The object of the present invention is to provide an anti-skid brake system for an automotive vehicle so adapted as to perform control of the wheel so as not to be locked, when braked, by assuming a road surface friction coefficient $\mu$, particularly a high road surface friction coefficient $\mu$, during the control by the anti-skid brake system.

In order to achieve the aforesaid object, the present invention consists of an anti-skid brake system for an automotive vehicle, which controls a braking force so as not to lock a wheel at the moment of braking and which alters a control value for controlling the braking force in accordance with an assumed road surface friction coefficient $\mu$, wherein:

the braking force is set to shift from a state in which the braking force is increased to a state in which the braking force is retained when a magnitude of deceleration of the wheel becomes greater than a first predetermined threshold value;

the first predetermined threshold value is set to become smaller as a road surface friction coefficient $\mu$ is smaller; and means for altering the assumed road surface friction coefficient $\mu$ to a higher road surface friction coefficient $\mu$ when a period of time required between the moment at which control for increasing the braking force starts and the moment at which control for retaining the braking force starts is equal to or longer than a predetermined period of time.

With this arrangement, the fact that the period of time required from the start of the control for increasing the braking force to the start of the following control for reducing the braking force, i.e. the period of time required for the control for elevating the braking force itself, is shorter than the predetermined period of time is considered that the actual road surface friction coefficient $\mu$ becomes rapidly lower than beforehand. When the portion of the road where the road surface friction coefficient $\mu$ becomes rapidly lower is determined very short, the rapidly lowered road surface friction coefficient $\mu$ is disregarded as if it is as high as that on the rest of the road and determined to be the road surface friction coefficient $\mu$ on that portion as high as beforehand, thereby allowing the control value for the high road surface friction coefficient $\mu$ to be utilized and ensuring a sufficient magnitude of the braking force.

The anti-skid brake system according to the present invention can detect a quick shift from a low road surface friction coefficient $\mu$ to a high value with high response, thereby performing the control by the anti-skid brake system in an appropriate fashion.

Other objects, features and advantages of the present invention will become apparent in the course of the description of the preferred embodiments, which follows, with reference to the accompanying drawings.

BRIEF DESCRIPTION OF THE DRAWINGS

FIGS. 3 to 5 are flow charts showing an example of the control by the anti-skid brake system according to the present invention.

FIG. 6 is a graph showing the relationship between the road surface friction coefficient $\mu$ and reference deceleration.

DESCRIPTION OF THE PREFERRED EMBODIMENTS

Figure 1:
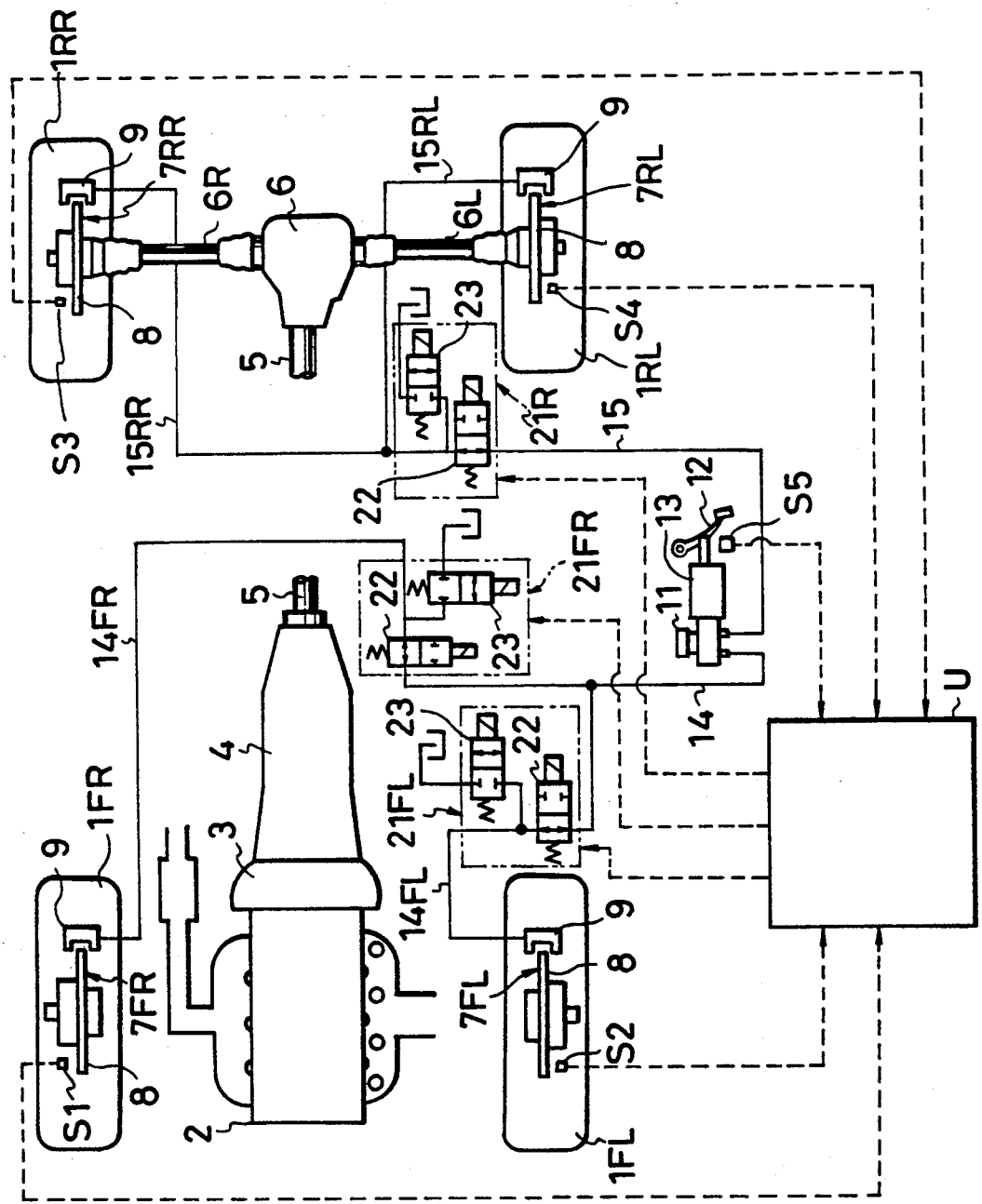
FIG. 1 is a system representation showing an outline of the anti-skid brake system according to an embodiment of the present invention.

As shown in FIG. 1, reference numeral 1FR stands for a right-hand front wheel, reference numeral 1FL for a left-hand front wheel, reference numeral 1RR for a right-hand rear wheel and reference numeral 1RL for a left-hand rear wheel. The output torque of an engine 2 is transmitted through a clutch 3, a transmission 4, a propeller shaft 5 and a differential 6 to a right-hand driving shaft 6R and a left-hand driving shaft 6L, through which the output torque is transmitted to the right-hand rear wheel 1RR and the left-hand rear wheel 1RL, respectively.

Mounted to the wheels 1FR, 1FL, 1RR and 1RL are braking units 7FR, 7FL, 7RR and 7RL, respectively, each of which has a disc 8 arranged so as to be rotatable integrally with the respective wheel and a caliper 9 with a wheel cylinder built therein.

Reference numeral 11 denotes a master cylinder as means for generating braking oil pressure, and a force obtained by depressing a braking pedal 12 is entered into the master cylinder 11 through a servomechanism 13. The master cylinder 11 is of a tandem type having two outlets, and a braking pipe 14 extending from one of the outlets branches into two branch pipe sections at its intermediate position. The right-hand branch pipe sections 14FR is connected to the wheel cylinder of the brake unit 7FR for the right-hand front wheel, while the left-hand branch pipe section 14FL is connected to the wheel cylinder of the brake unit 7FL for the left-hand front wheel. Further, a braking pipe 15 extending from the other outlet of the master cylinder 11 branches into two branch pipe sections at its intermediate position, and the right-hand branch pipe section 15RR is connected to the wheel cylinder of the brake unit 7RR for the right-hand rear wheel while the left-hand branch pipe section 15RL is connected to the wheel cylinder of the brake unit 7RL for the left-hand rear wheel.

A right-hand oil pressure adjusting mechanism 21FR is connected to the right-hand branch pipe section 14FR for the right-hand front wheel and a left-hand oil pressure adjusting mechanism 21FL is connected to the left-hand branch pipe section 14FL for the left-hand front wheel. On the other hand, a common oil pressure adjusting mechanism 21R is connected to the common pipe 15 for the right-hand and left-hand rear wheels. Each of the oil pressure adjusting mechanisms 21FR, 21FL and 21R has a first opening-closing valve 22 and a second opening-closing valve 23, each of the first and second opening-closing valves 22 and 23 being of an electromagnetic type. The first opening-closing valve 22 opens or closes the right-hand pipe section 14FR, the left-hand pipe section 14FL or the common pipe 15, while the second opening-closing valve 23 opens or closes a passage communicating each of the pipes with a reserve tank. This arrangement can shift the braking oil pressure to be supplied to the brake units 7FR, 7FL, 7RR and 7RL so as to be increased, decreased or retained, when the wheels are braked by the braking oil pressure generated in the master cylinder 21. In other words, the braking oil pressure is decreased by closing the first opening-closing valve 22 and opening the second opening-closing valve 23, the braking oil pressure is increased by opening the first opening-closing valve 22 and closing the second opening-closing valve 23, and the oil pressure is retained by closing both of the first and second opening-closing valves 22 and 23. It is further to be noted in this embodiment that the braking oil pressure is rapidly increased in the initial stage of an increase in the braking oil pressure and the rate of the increase in thereafter slowed down to such an extent as increasing gradually. This control is implemented, for example, by subjecting a speed (an angle) of opening the first opening-closing valve 22 to duty control.

In FIG. 1, reference symbol U denotes a control unit composed of a microcomputer with CPU, ROM, RAM, CLOCK, I/O interface, etc. built therein. Entered into the control unit U are signals from switches S1, S2, S3 and S4, which are to sense speeds of rotation of the right-hand and left-hand front wheels 1FR and 1FL as well as the right-hand and left-hand rear wheels 1RR and 1RL, respectively. Further, a signal from a switch S5 is entered, which is a brake switch that is turned on when the braking pedal 12 is depressed. The control unit U controls the oil pressure adjusting mechanisms 21FR, 21FL and 21R, while the control unit U performs the ABS control for the right-hand and left-hand front wheels 1FR and 1FL in an independent and separate manner as well as for the right-hand and left-hand rear wheels 1RR and 1RL in an integrated manner. It is to be noted that the ABS control is performed when the brake switch S5 is turned on.

FIG. 2

Figure 2:
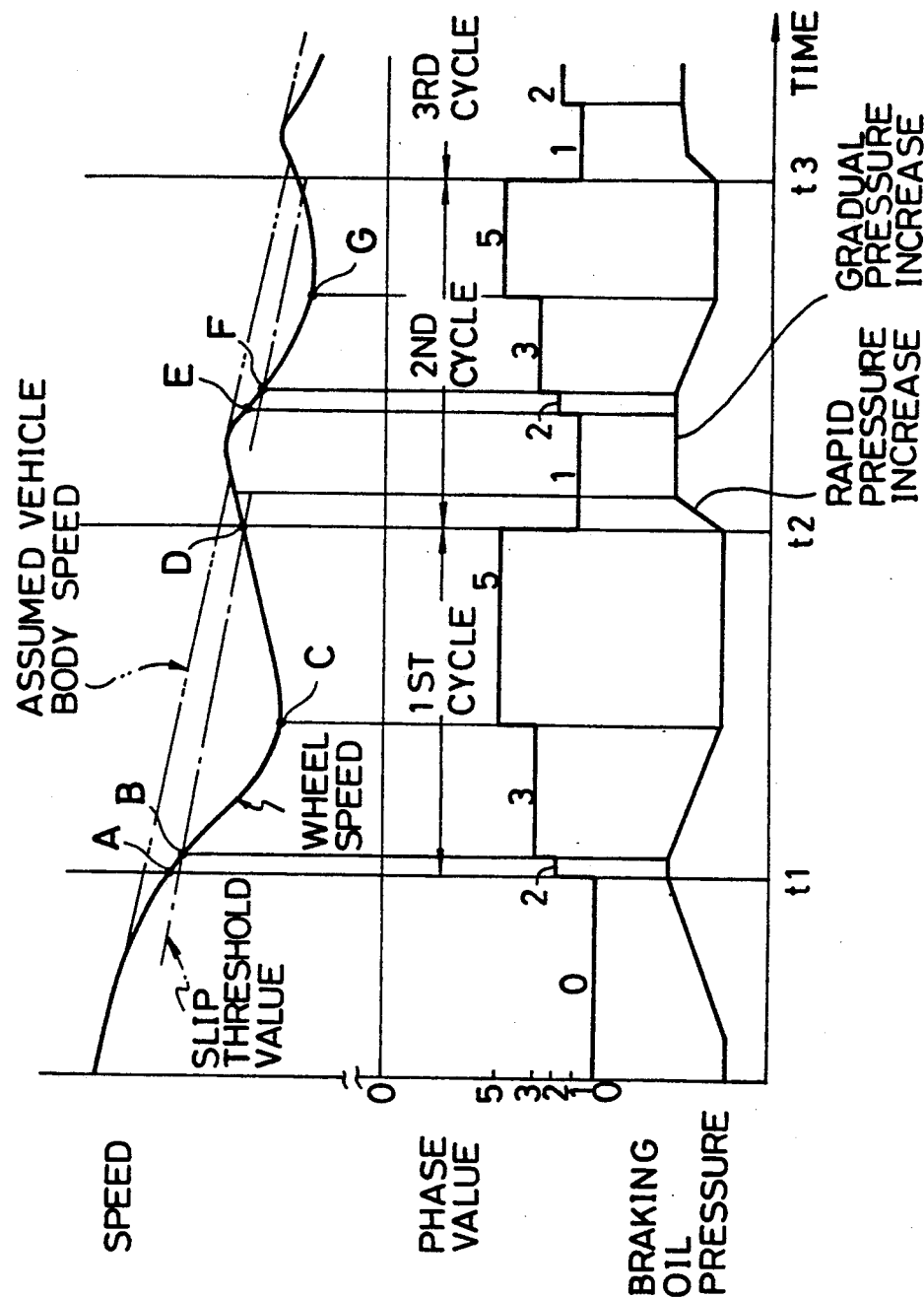
FIG. 2 is a time chart showing control of the anti-skid brake system according to the present invention.

The contents of the ABS control by the control unit U will be described with reference to FIG. 2. In performing the ABS control, phases 0, 1, 2, 3 and 5 are employed, which have the following meanings:

Phase 0: non-ABS control
Phase 1: increasing pressure
Phase 2: retaining pressure after non-ABS control or after increasing pressure
Phase 3: decreasing pressure
Phase 5: retaining pressure after control for decreasing pressure The slip value indicating the tendency of locking the wheel is determined by the following formula:

Slip value=(wheel speed/assumed vehicle body speed)×100%

Given the foregoing, no ABS control is performed up to the time t1 (phase 0) and the wheel speed is slowed down gradually to a level lower than the assumed vehicle body speed as the braking oil pressure is elevated. By slowing the wheel speed down, the deceleration of the wheel speed is increased and reaches a predetermined value at the time t1, i.e. moment A, which satisfies the condition under which to start the ABS control, i.e. control by the anti-skid brake system.

As the ABS control starts at the moment A, the braking oil pressure is first retained. The wheel speed is slowed down, however, while the braking oil pressure is retained. As the slip value is decreased and reaches a predetermined threshold value at the moment B (phase 2), then the oil pressure starts reducing and the extent to which the wheel speed is slowed down becomes so slow that the deceleration reaches approximately zero at the moment C (phase 3).

At the moment C when the deceleration has reached approximately zero, the braking oil pressure is retained as it is, thereby increasing the wheel speed gradually and returning the slip value to the predetermined threshold value at the moment D (phase 5). From the moment D, the braking oil pressure is increased in such a manner that it is increased in the initial stage to such an extent as the rate of increasing the pressure is rapid and thereafter to a slower extent. It is noted that phase 1 continues from the moment D to the moment E (phase 1).

By increasing the braking oil pressure at the moment D, the deceleration of the wheel speed is increased again and reaches the predetermined value satisfying the condition for the start of the ABS control at the moment E. Then, the braking oil pressure is retained from the moment E up to the moment F at which the slip value is lowered to a predetermined threshold value (phase 2), followed by reducing the braking oil pressure up to the moment G (phase 3) corresponding to the moment C. After the moment G, the braking oil pressure is retained (phase 5).

The arrangement as described hereinabove is an outline of the ABS control, i.e. the control by the anti-skid brake system. One control cycle continues from the moment D at which phase 5 ends, i.e. from the moment when the braking oil pressure has been decreased and starts increasing, to the end of the next phase 5. In other words, one control cycle comprises phases 1, 2, 3 and 5. It is to be noted herein that only the very first control cycle comprises phases 2, 3 and 5 because the ABS control starts from the phase 2.

The threshold value at which the phase is changed varies with a friction coefficient $\mu$ on a road surface, i.e. a road surface friction coefficient $\mu$. An example of setting the threshold values in accordance with the road surface friction coefficient $\mu$ is shown as follows:

| Road Surface Friction Co-efficient $\mu$ | Phases | | |
|---|---|---|---|
| | 1 → 2 | 2 → 3<br>5 → 1 | 3 → 5 |
| 1 (Low) | −0.5 G | 95% | 0 G |
| 2 (Medium) | −1.0 G | 90% | −0.2 G |
| 3 (High) | −1.5 G | 85% | −0.5 G |

FIG. 3

Figure 3:
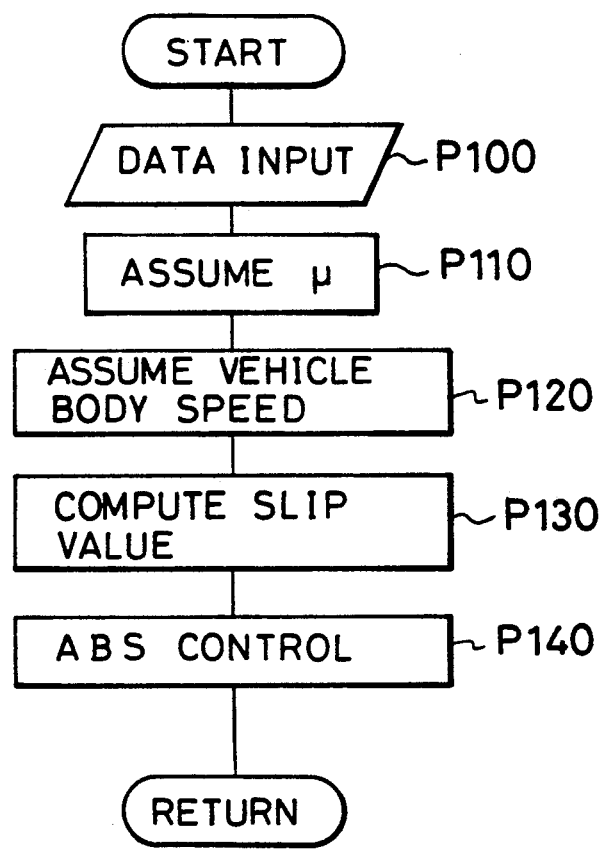

FIG. 3 shows the flow chart showing an example of the control relating to the present invention.

First, at step P100, signals are entered into the control unit U from the switches S1 to S5, followed by proceeding to step P110 at which the road surface friction coefficient $\mu$ is assumed. Then, at step P120, the vehicle body speed is assumed to determine the assumed vehicle body speed and, at step P130, the slip value for the ABS control is computed, followed by proceeding to step P140 at which the ABS control is implemented.

FIG. 4

FIG. 4 shows the practices for assuming the road surface friction coefficient $\mu$ according to the contents at step P110 of FIG. 3.

First, at step P1, a decision is made to determine if the ABS control is currently in progress and the road surface friction coefficient $\mu$ is set at step P2 to 3 ($\mu=3$), i.e. a high road surface friction coefficient $\mu$, when it is decided at step P1 that no ABS control is currently in progress. In other words, when no control by the anti-skid brake system is currently carried out, the road surface friction coefficient $\mu$ is forcibly set to a high value, thereby suppressing the braking oil pressure from being reduced at the initial time when the ABS control starts and reducing the braking distance.

On the other hand, when the result of decision at step P1 indicates that the ABS control is currently being performed, then the program flow goes to step P3 at which the speed of accelerating or decelerating the wheels, WG, is computed (renewed) by differentiating the wheel speeds. In computing the speed of accelerating or decelerating the wheels, WG, the maximum value for a predetermined period of time is stored in the RAM of the control unit U as acceleration, while the minimum value therefor is stored as deceleration. Then, at step P4, it is decided to determine if the deceleration (WG) is smaller than −20 G as a predetermined threshold value. It is to be noted herein that the threshold value of −20 G means a value corresponding to −20 G in a predetermined sampling cycle and this meaning is applicable likewise to the following description.

When the result of decision at step P4 indicates that the deceleration is smaller than −20 G, there is the possibility that the road surface friction coefficient $\mu$ is so low that, at step P5, a decision is made to determine if the acceleration (WG) is larger than 10 G. When it is decided at step P5 that the magnitude of acceleration is not larger than 10 G, then the road surface friction coefficient $\mu$ is set at step P8 to 1 ($\mu=1$), i.e. a low road surface friction coefficient $\mu$.

On the other hand, when the result of decision at step P4 indicates that the deceleration is not smaller than −20 G or the result of decision at step P5 indicates that the acceleration is larger than 10 G, then the program flow goes to step P6 at which a decision is made to determine if the acceleration (WG) is larger than 20 G. If a result of decision at step P6 indicates that the acceleration (WG) is not larger than 20 G, then the road surface friction coefficient $\mu$ is set at step P7 to 2 ($\mu=2$), i.e. a medium road surface friction coefficient $\mu$. On the other hand, when it is decided at step P6 that the acceleration is larger than 20 G, then the program flow is returned to step P9 at which the road surface friction coefficient $\mu$ is set to 3 ($\mu=3$).

After steps P7 or P8, a decision is further made at step P10 to determine if phase 1 continues for a predetermined period of time or shorter. When it is decided at step P10 that the phase 1 continues for a period of time longer than the predetermined period of time, on the one hand, the road surface friction coefficient $\mu$ is set at step P11 to a value higher by one stage than the previous road surface friction coefficient $\mu$ determined at step P7 or step P8. On the other hand, when the result of decision at step P10 is in the negative, then the program flow is returned as it is.

FIGS. 5 and 6

FIGS. 5 and 6 show the practices for assuming the vehicle body speed corresponding to the contents of the control at step P120 in FIG. 3.

First, at step P21 of FIG. 5, the wheel speeds of all the wheels 1FR, 1FL, 1RR and 1RL are detected and the fastest one out of the four wheels is set as a maximum wheel speed WM. Then, at step P22, a varying quantity of the wheel having the maximum wheel speed WM, i.e. a magnitude of acceleration or deceleration, WM G, of the maximum wheel speed, is computed by differentiating the maximum wheel speed WM.

Then, at step P23, a reference deceleration −GO is determined in accordance with the road surface friction coefficient $\mu$. It is to be noted herein that the term "reference deceleration −GO" is intended to mean maximum deceleration to be predicted as occurring in accordance with the road surface friction coefficient $\mu$ at the moment of braking. FIG. 6 shows the relationship between the reference deceleration −GO and the road surface friction coefficient $\mu$. In FIG. 6, the reference deceleration −GO is set to be smaller as the road surface friction coefficient $\mu$ becomes smaller. In other words, the absolute value GO of the reference deceleration −GO is set to be larger as the road surface friction coefficient $\mu$ becomes smaller. In this embodiment, the reference deceleration −GO is determined in three stages because the road surface friction coefficient $\mu$ is so arranged as to be determined in three stages.

Then, at step P24, a decision is made to determine if the magnitude of acceleration or deceleration, WM. G, of the maximum wheel speed is smaller than the reference deceleration −GO. When it is decided at step P24 that the magnitude of acceleration or deceleration, WM. G, of the maximum wheel speed is equal to or smaller than the reference deceleration −GO, then the program flow goes to step P25 at which the assumed vehicle body speed VR is set on the basis of the reference deceleration −GO, followed by the return of the program flow. In other words, as the wheel speed at this moment becomes small rapidly, a value obtainable by subtracting the speed corresponding to the reference deceleration −GO from the previously (latest) assumed vehicle body speed VR is set as the next (current) assumed vehicle body speed VR in order to suppress the assumed vehicle body speed from being reduced rapidly.

When it is decided at step P24 that the magnitude of acceleration or deceleration, WM. G, of the maximum wheel speed is larger than the reference deceleration −GO, on the other hand, then a decision is made at step P26 to determine if the value obtainable by subtracting the maximum wheel speed WM from the previous assumed vehicle body speed VR is equal to or larger than a predetermined value. When it is decided that the magnitude of acceleration or deceleration, WM. G, of the maximum wheel speed is larger than the reference deceleration −GO, then the program flow proceeds to step P25 in order to suppress the assumed vehicle body speed from being decreased rapidly because the wheel speed at this moment is decreasing to a considerably rapid extent.

On the other hand, when the result of decision at step P26 indicates that the magnitude of acceleration or deceleration, WM. G, of the maximum wheel speed is smaller than the reference deceleration −GO, then the maximum wheel speed WM is set as the assumed vehicle body speed as it is.

It is noted as a matter of course that the assumed vehicle body speed determined at step P25 or P27 is employed as the previous assumed vehicle body speed at step P26.

It is to be understood that the present invention is not construed as being restricted to those described hereinabove, which are described merely for illustrative purposed, and as encompassing all changes, variations, and modifications within the spirit and scope of the present invention.

What is claimed is:

1. An anti-skid brake system for an automotive vehicle, which controls a braking force so as to lock no wheel at the moment of braking and which alters a control value for controlling the braking force in accordance with an assumed road surface friction coefficient $\mu$, wherein:

the braking force is set to shift from a state in which the braking force is increased to a state in which the braking force is retained when a magnitude of deceleration of the wheel becomes greater than a first predetermined threshold value;

the first predetermined threshold value is set to become smaller as a road surface friction coefficient $\mu$ is smaller; and means for altering the assumed road surface friction coefficient $\mu$ to a higher road surface friction coefficient $\mu$ when a period of time required between the moment at which control for increasing the braking force starts and the moment at which control for retaining the braking force starts after the control for increasing the braking force is equal to or shorter than a predetermined period of time.

2. An anti-skid brake system as claimed in claim 1, wherein the road surface friction coefficient $\mu$ is assumed on the basis of a magnitude of acceleration or deceleration of the wheel.

3. An anti-skid brake system as claimed in claim 2, wherein the road surface friction coefficient $\mu$ is assumed on the basis of maximum acceleration and maximum deceleration of the wheel in a predetermined period of time.

4. An anti-skid brake system as claimed in claim 2, wherein the road surface friction coefficient $\mu$ is assumed on the basis of the magnitude of acceleration or deceleration of the wheel only when the braking force is controlled.

5. An anti-skid brake system as claimed in claim 1, wherein the road surface friction coefficient $\mu$ is assumed to be as a highest road surface friction coefficient $\mu$ when no control by the braking force controlling means is performed.

6. An anti-skid brake system as claimed in claim 1, wherein either one selected from a plurality of road surface friction coefficient $\mu$ set stepwise in advance is determined as the assumed road surface friction coefficient $\mu$.

7. An anti-skid brake system as claimed in claim 6, wherein the means for altering the assumed road surface friction coefficient $\mu$ selects a road surface friction coefficient $\mu$ having a value higher by one stage than the assumed road surface friction coefficient $\mu$ from the plurality of road surface friction coefficient $\mu$ set stepwise in advance.

8. An anti-skid brake system as claimed in claim 6, wherein the highest road surface friction coefficient $\mu$ selected from the plurality of road surface friction coefficient $\mu$ set stepwise in advance is selected as the assumed road surface friction coefficient $\mu$ when no control by the braking force controlling means is performed.

9. An anti-skid brake system as claimed in claim 1, wherein a control value to be altered in accordance with the road surface friction coefficient $\mu$ is determined as a controlling threshold value for controlling the braking force.

10. An anti-skid brake system as claimed in claim 9, wherein the controlling threshold value is set as the magnitudie of deceleration of the wheel and as a slip value indicating the tendency of locking the wheel.

11. An anti-skid brake system as claimed in claim 1, wherein control of the braking force is performed by control for increasing, decreasing and retaining the braking force.

12. An anti-skid brake system as claimed in claim 11, wherein:
the control of the braking force is performed by the control for retaining the braking force after the control for increasing the braking force; or
the control of the braking force is performed by the control for retaining the braking force after the cotnrol for decreasing the braking force.

13. An anti-skid brake system as claimed in claim 12, wherein the control of the braking force is performed by the control for retaining the braking force at the moment of starting the control of the braking force.

14. An anti-skid brake system as claimed in claim 13, wherein the second predetermined threshold value is set as a value that becomes smaller as the road surface friction coefficient $\mu$ becomes smaller.

15. An anti-skid brake system as claimed in claim 11, wherein the control of the braking force is performed by the control for retaining the braking force starts after the control for decreasing the braking force at the moment when the magnitude of deceleration of the wheel reaches a value smaller than a second predetermined threshold value.

16. An anti-skid brake system as claimed in claim 11, further comprising:
slip value detecting means for detecting a slip value indicating the tendency of locking the wheel;
wherein the control for increasing the braking force starts at the moment when the slip value of the wheel detected by the slip value detecting means reaches a value that exists in a direction of making the tendency of locking the wheel smaller than a third predetermined threshold value; and
wherein the control for decreasing the braking force starts when the slip value of the wheel detected by the slip value detecting means reaches a value that exists in a direction making the tendency of locking the wheel larger than a fourth predetermined threshold value.

17. An anti-skid brake system as claimed in claim 16, wherein the third predetermined threshold value is set as a value equal to the fourth predetermined threshold value.

18. An anti-skid brake system as claimed in claim 15, wherein the slip value as the third predetermined threshold value and as the fourth predetermined threshold value is set as a value that makes the tendency of locking the wheel smaller as the road surface friction coefficient $\mu$ becomes smaller.

19. An anti-skid brake system as claimed in claim 15, wherein the slip value is computed on the basis of a vehicle speed and a wheel speed.

20. An anti-skid brake system for an automotive vehicle, comprising:
deceleration detecting means for detecting a magnitude of deceleration of a wheel;
slip value detecting means for detecting a slip value indicating a tendency of locking the wheel;
braking force controlling means for controlling a braking force by increasing, decreasing and retaining the braking force so as not to lock the wheel at the moment of braking, in response to output from the deceleration detecting means and the slip value detecting means;
road surface friction coefficient $\mu$ assuming means for assuming a road surface friction coefficient $\mu$ on the basis of a predetermined condition;
threshold value altering means for altering a controlling threshold value for controlling the braking force controlling means on the basis of the road surface friction coefficient $\mu$ assumed by the road surface friction coefficient $\mu$ assuming means; and
road surface friction coefficient $\mu$ altering means for altering the road surface friction coefficient $\mu$ assumed by the road surface friction coefficient $\mu$ assuming means;
wherein the braking force controlling means is arranged to shift from a state in which control for increasing the braking force is performed to a state in which control for retaining the braking force is performed when the magnitude of deceleration of the wheel reaches a value greater than the first predetermined threshold value;
wherein the threshold value altering means is set to make the first predetermined threshold value smaller as the road surface friction coefficient $\mu$ becomes smaller; and
wherein the road surface friction coefficient $\mu$ altering means is set to alter the road surface friction coefficient $\mu$ assumed by the road surface friction coefficient $\mu$ assuming means to a value having a higher road surface friction coefficient $\mu$ when a period of time required from the moment when the control for increasing the braking force starts to the moment when the control for retaining the braking force starts after the control for increasing the braking force is equal to or longer than a predetermined period of time.

21. An anti-skid brake system as claimed in claim 20, wherein:
the braking force controlling means performs the control for increasing braking force, control for retaining the braking force after the control for increasing the braking force, control for decreasing the braking force, and control for retaining the braking force after the control for decreasing the braking force; and
the controlling threshold value contains the first threshold value, a second threshold value for shifting from the control for decreasing the braking force to the control for retaining the braking force, a third threshold value for starting the control for increasing the braking force, and a fourth threshold value for starting the control for decreasing the braking force;
wherein the second threshold value is set on the basis of a magnitude of deceleration as a parameter;
wherein each of the third threshold value and the fourth threshold value is set on the basis of the slip value of the wheel as a parameter; and
wherein the threshold value altering means alters the second threshold value so as to become larger and each of the third and fourth threshold values so as to give a value that exists in a direction of making a tendency of locking the wheel larger, when the road surface friction coefficient $\mu$ is altered to a higher road surface friction coefficient $\mu$ by the road surface friction coefficient $\mu$ altering means.

22. An anti-skid brake system as claimed in claim 20, wherein:
 a plurality of road surface friction coefficients $\mu$ are preset as the assumed road surface friction coefficients $\mu$; and
 the road surface friction coefficient $\mu$ assuming means selects either one of the plurality of the road surface friction coefficients $\mu$ preset on the basis of the magnitudie of acceleration or deceleration of the wheel when control by the braking force controlling means is performed and selects the highest road surface friction coefficient $\mu$ when no control by the braking force controlling means is performed.

* * * * *